United States Patent [19]

Mioche

[11] Patent Number: 4,513,648
[45] Date of Patent: Apr. 30, 1985

[54] METHOD AND APPARATUS FOR OBTAINING SHEETS FROM A FLEXIBLE MATERIAL, PARTICULARLY A LATEX COAGULUM

[75] Inventor: Robert Mioche, Durtol, France

[73] Assignee: Compagnie Generale des Etablissements Michelin, Clermont-Ferrand, France

[21] Appl. No.: 502,977

[22] Filed: Jun. 10, 1983

[30] Foreign Application Priority Data

Jun. 10, 1982 [FR] France ................................ 82 10283

[51] Int. Cl.³ .......................... B26D 1/46; B26D 3/28; B26D 7/01
[52] U.S. Cl. ........................................ 83/871; 83/19; 83/22; 83/169; 83/176; 264/158
[58] Field of Search .................... 83/871, 19, 22, 176, 83/870, 872, 873, 169; 264/158

[56] References Cited

U.S. PATENT DOCUMENTS

| | | |
|---|---|---|
| 2,878,868 | 3/1959 | Brandt et al. |
| 3,263,537 | 8/1966 | Rehman et al. .......................... 83/871 |
| 3,517,414 | 6/1970 | Carson, Jr. .......................... 264/158 X |
| 3,736,820 | 6/1973 | Jung ........................................ 83/871 |
| 4,275,632 | 6/1981 | Ross .................................. 83/795 X |

FOREIGN PATENT DOCUMENTS

| | | |
|---|---|---|
| 2306356 | 8/1974 | Fed. Rep. of Germany . |
| 777716 | 2/1935 | France . |
| 1092113 | 4/1955 | France . |
| 340055 | 9/1959 | Switzerland . |
| 894491 | 4/1962 | United Kingdom . |
| 1168367 | 10/1969 | United Kingdom . |

Primary Examiner—Frank T. Yost
Attorney, Agent, or Firm—Brumbaugh, Graves, Donohue & Raymond

[57] ABSTRACT

A method and apparatus for obtaining sheets from a flexible material, particularly a latex coagulum, is characterized by the following features:
(a) the material is floated in a fluid so that a part of the material emerges above the fluid;
(b) a depression is produced on a portion of the emerged part by the use of depressing means;
(c) sheets are cut off from the depressed portion by the use of cutting means; and
(d) the thickness of the sheets is adjusted by varying the difference in height between the level of the depressing means and the level of the cutting means in the depressed portion.

23 Claims, 4 Drawing Figures

METHOD AND APPARATUS FOR OBTAINING SHEETS FROM A FLEXIBLE MATERIAL, PARTICULARLY A LATEX COAGULUM

The present invention relates to a method for obtaining sheets from a flexible material.

By way of example, such material may be a rubber, in particular a rubber obtained by coagulation of a latex, the material being in such case commonly known as "coagulum." It should be noted, however, that the invention can be applied to other materials, for instance plastics or foodstuffs.

The known methods employed in natural rubber plantations for the production of sheets consist in coagulating the latex in tanks having aluminum partitions arranged as baffles. These sheets then undergo known treatments, for instance a calendering followed by a drying.

This method of obtaining sheets has the following drawbacks:

the coagulation installations require a large number of tanks, which raises problems as to location and makes high investments necessary;

these tanks in their turn are complicated, fragile and expensive; they furthermore require extensive labor for their operation and cleaning;

for each tank, the location of the aluminum partitions is invariable; it is therefore necessary to adjust the concentration of the latex, for example by dilution, in order to impart to it a constant value which is predetermined in such a manner that the sheets of coagulum (that is to say, the sheets of coagulated latex) obtained in this tank are capable of having a constant thickness after drying, this adjustment being both lengthy and costly;

upon the coagulation, the surface/volume ratio of the coagulum is large so that its surface which is in contact with the air is great, which results in very substantial oxidation of the surface of the coagulum and therefore in degradation of the material and a detrimental change in quality.

In order to attempt to eliminate these drawbacks, it has been tried to obtain thick blocks upon the coagulation and then cut these blocks into sheets. Experience shows that this cutting operation encounters extensive difficulties, as a result, in particular, of the flexibility, lack of rigidity and low tensile strength of the coagulum. The handling apparatus used upon the cutting led, for instance, to a crushing or breaking of the coagulum, which raises complicated problems of manufacture and results in substantial variations in quality.

The object of the present invention is to overcome these drawbacks.

Therefore, the method of the present invention for obtaining sheets from a flexible material is characterized by the following features:

(a) the material is floated in a fluid so that a part of the material emerges above the fluid;

(b) a depression is produced on a portion of the emerged part by the use of depressing means;

(c) sheets are cut off from the depressed portion by the use of cutting means; and (d) the thickness of the sheets is adjusted by varying the difference in height between the level of the depressing means and the level of the cutting means in the depressed portion.

The invention also relates to apparatus for carrying out this method, as well as the sheets obtained by this method or with the apparatus.

The embodiments of the invention which follow as well as the figures of the drawing corresponding to these embodiments (all of which are schematic) are intended to illustrate the invention and facilitate an understanding thereof without, however, limiting its scope.

Referring to the drawing.

Figure 1:
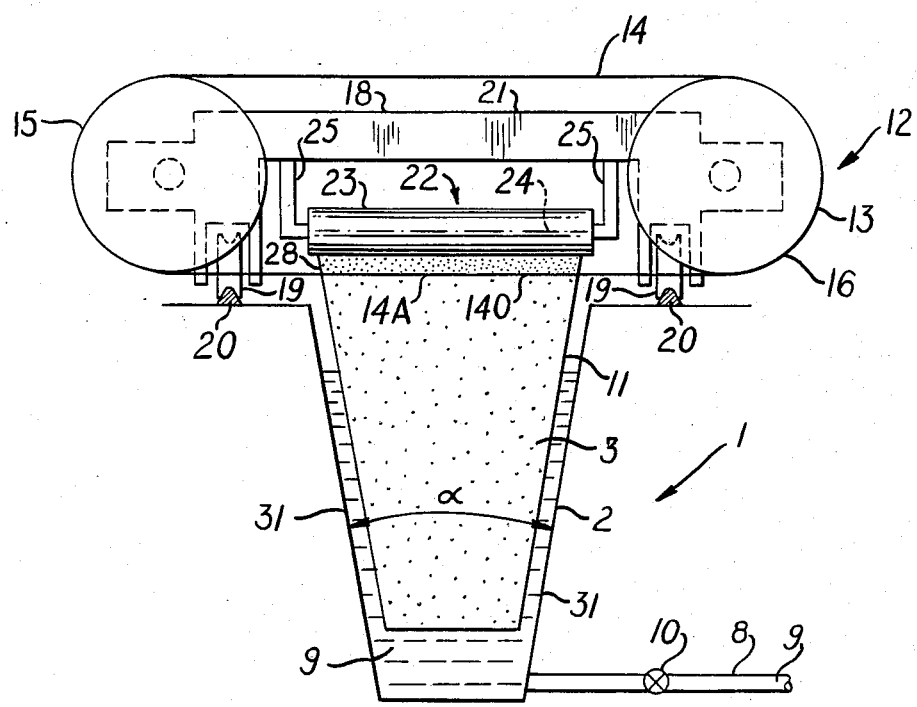
FIG. 1 shows, in vertical section, an apparatus in accordance with the invention, the plane of the section being taken along the line I—I of FIG. 2.
Figure 2:
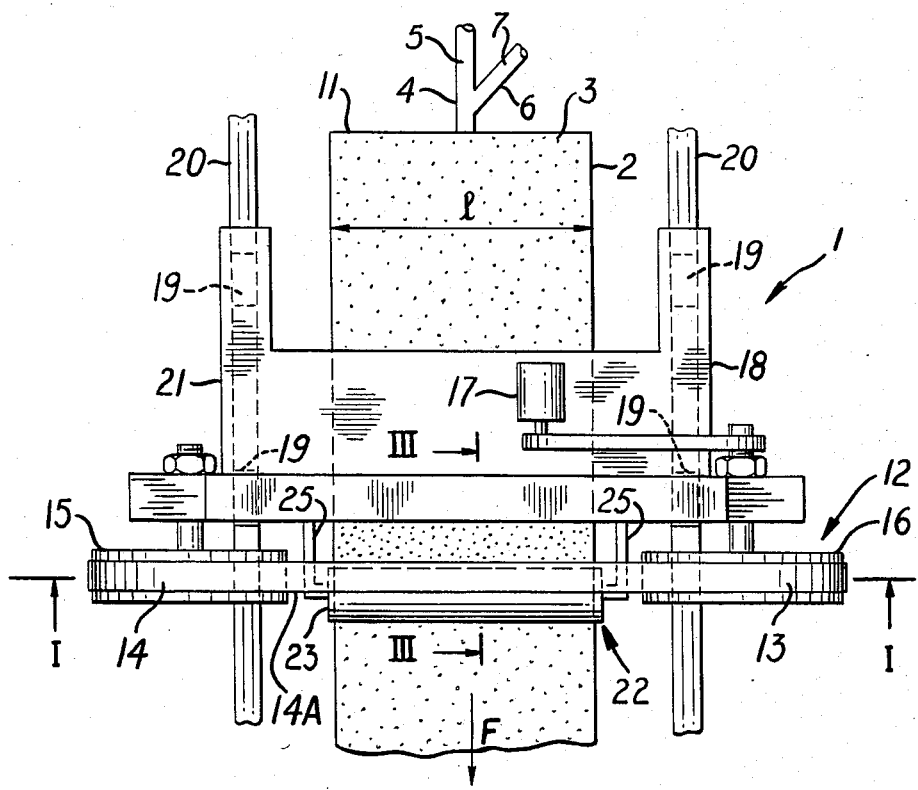
FIG. 2 is a plan view from above of the apparatus shown in FIG. 1.
Figure 3:
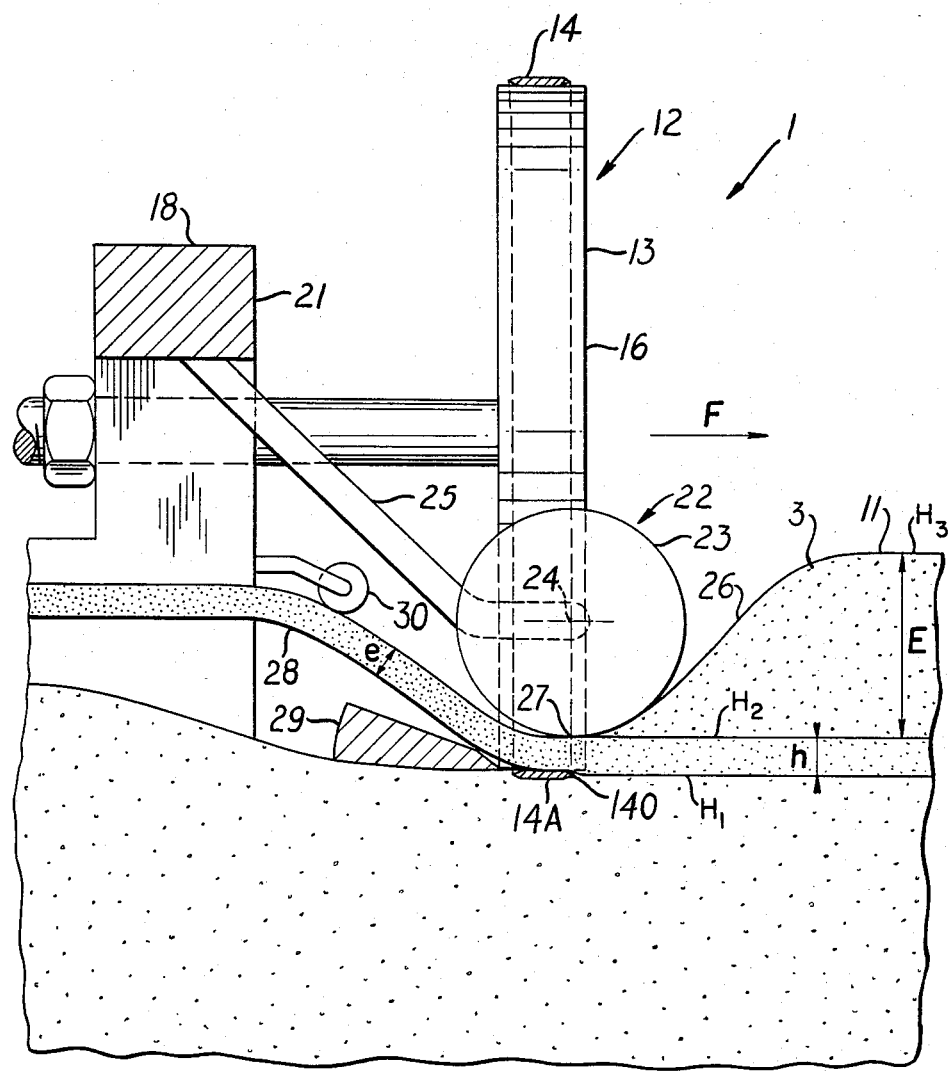
FIG. 3 shows, in vertical section, a part of the apparatus shown in FIGS. 1 and 2, the plane of the section being taken along the line III—III in FIG. 2.

FIGS. 1, 2 and 3 show an apparatus 1 in accordance with the invention. This apparatus 1 comprises a tank 2 of elongated shape, arranged horizontally in its lengthwise direction. Within the tank 2 there is a material 3 which is intended to be cut into sheets. By way of example, this material is a block of natural rubber obtained previously directly within the tank 2 by coagulation from a latex introduced into this tank 2. The known means for obtaining this latex coagulum comprise, for instance, a conduit 4 for latex 5 discharging at one end of the tank 2 and a conduit 6 for coagulating agent 7, said agent consisting in particular of formic acid, acetic acid or a biological agent. For purposes of homogenization, the conduit 6 for the coagulating agent discharges into the latex conduit 4 (FIG. 2). It goes without saying that other means are also possible for the obtaining of the block of coagulum 3.

The apparatus 1 comprises a conduit 8 which makes it possible to introduce a fluid 9 into the tank 2, the fluid 9 being, for example, a liquid, in particular water, said entrance of fluid being controlled by the valve 10 (FIG. 1). The water 9 is introduced into the tank 2 in such a manner that the water is directly in contact with the material 3, which thus floats in the water and comprises a part 11 which is located above the water and is referred to as the "emerged part." The coagulum 3 floats in the water 9, since its density varies in practice between 0.6 and 0.9 g/cc.

The apparatus 1 has means 12 capable of cutting off sheets from the emerged part 11. These cutting means comprise a saw 13 with a band 14 wound around two pulleys 15, 16, the band 14 having a cutting edge 140 which is preferably toothless. The pulley 16 is driven by the motor 17. The assembly of the pulleys 15, 16 and the motor 17 is fastened on a chassis 18, itself mounted on four wheels 19 which travel on two horizontal rails 20 arranged along the upper part of the tank 2, on opposite sides of the tank 2. The chassis 18 and the wheels 19 therefore constitute a carriage 21 which is movable horizontally above the tank 2 and over the entire length of the tank 2. The equipment which permits the displacement of the carriage 21 along the material 3 on the rails 20 has not been shown in the drawing for purposes of simplification, this equipment comprising, for instance, a winch.

The apparatus 1 comprises means which make it possible to produce a depression on a portion of the emerged part 11. These depressing means 22 comprise, for instance, a roller 23 whose shaft 24 is parallel to the cutting edge 140 of the band 14. This roller 23 is, for instance, of cylindrical shape and its length is preferably equal to or greater than the width "l" of the tank 2, measured at the upper part of the tank 2 (FIGS. 1 and 2). The shaft 24 is attached to two arms 25 which in their turn are attached to the chassis 18. The roller 23 rests on the emerged part 11 and produces a depression on the portion 26 of the emerged part (FIG. 3). This depression is localized in the portion 26 in view of the flexibility of the coagulum. Upon the displacement of the carriage 21 in the direction indicated by the arrow F (FIGS. 2, 3) the roller 23 rolls on the emerged part 11, and therefore the portion 26, corresponding to the localized depression, is displaced along the material 3. The lower part 14A of the band 14 is of horizontal direction and the cutting edge 140 of this lower part 14A is located at a level $H_1$. The lowest generatrix 27 of the roller cylinder 23 is referred to as the "lower generatrix" and it is located at a level $H_2$ which is higher than the level $H_1$.

The lower part 14A makes it possible to cut the material 3 horizontally in the depressed portion 26. Upon the advance of the carriage 21 one thus obtains a sheet 28 whose thickness "e" varies as a function of the difference in height "h" between the levels $H_1$, $H_2$ in the depressed portion (FIG. 3).

The thickness "e" can, for instance, be adjusted as desired by modifying the height of the roller 23, that is to say, the level $H_2$, by known means not shown in the drawing, such means being, for instance, articulations, levers or cylinders which make it possible to modify the orientation of the arms 25. The thickness "e" can also be adjusted by modifying the level $H_1$ of the lower part 14A of the band 14 by known means, not shown in the drawing, this adjustment being obtained, for instance, by vertically displacing the pulleys 15, 16 by means of screws or cylinders.

In FIG. 2, the lower part 14A has been shown perpendicular to the rails 20, but one can contemplate cases in which this lower part 14A is not perpendicular to the rails 20 in order to favor the cutting of the block 3.

Since the block 3 floats in the liquid 9, the depressing means 22 make it possible, due to the buoyancy, to apply the block 3 against the lower part 14A of the band 14, which facilitates the cutting and makes it possible to obtain a constant thickness "e" for a given adjustment of the levels $H_1$, $H_2$.

The roller 23 is preferably arranged slightly in front of the band 14 in the direction of the arrow F, so that its lower generatrix 27 is arranged practically above the cutting edge 140 of the lower part 14A, as shown in FIG. 3. The thickness "e" is then practically equal to the difference in height "h" between the levels $H_1$, $H_2$, which thus represents the distance between the cutting edge 140 and the generatrix 27.

The amount of the depressing is represented by the difference in height E between the levels $H_3$ and $H_2$, $H_3$ being the upper level of the block 3 before the depressing, in front of the roller 23. E represents, for instance, 5% to 30% of the total height of the material 3 in the tank 2. This total height, not shown for purposes of simplification in the drawing, is measured on the block 3 before the depressing and before the cutting of the first sheet 28. It corresponds practically to the depth of the tank if the latter is completely filled with latex before the coagulation.

It goes without saying that the levels $H_1$, $H_2$, $H_3$ correspond to horizontal planes whose heights are measured with respect to the same horizontal reference plane, which has not been shown in the drawing for purposes of simplification.

The localized depressing due to the roller 23 takes place practically without any substantial crushing of the material 3 since the material 3 is of a flexible structure and floats in the liquid 9.

It goes without saying that the roller 23 could be replaced by any other means permitting localized depressing of the emerged part 11, for instance a plurality of rollers or wheels or a shoe sliding over the surface of this emerged part 11. In this case, the level $H_2$ corresponds again to the level of the lowest points of the depressing means 22 in contact with the material 3.

It also goes without saying that other means besides saws can be contemplated for cutting the sheets, for instance wires, possibly heated wires. In this case, the level $H_1$ again corresponds to the level of the points where the cutting of the material 3 is started. The upper level $H_3$ corresponds to the upper horizontal surface of the block 3 before the depressing, this surface being in contact with the air. This level $H_3$ is determined by the amount of water introduced into the tank 2 before each cutting. This level $H_3$ may possibly also be adjusted by controlling the density of the fluid 9, for instance by using a fluid which is heavier than pure water and is compatible with the material 3, in particular by using a feed of salt water (not shown in the drawing).

Separation between the sheet 28 and the rest of the material 3 is facilitated by arranging a wedge-shaped part 29 behind the roller 23 and near the lower part of the roller 23, the sheet 28 being arranged between the roller 23 and the wedge 29. The guiding of the sheet 28 with respect to the carriage 21 can be facilitated moreover by using one or more guide rollers 30 in contact with the sheet 28. For purposes of simplification, the wedge 29 and a guide roller 30 have been shown only in FIG. 3.

After the sheet 28 has been cut, it is shifted laterally by known means, not shown in the drawing for purposes of simplification, this means being, for instance, a conveyor belt or a flotation tank. A further amount of fluid 9 is then introduced, if desired, into the tank 2 so that the emerged part 11 reaches the same level as previously, and a new sheet 28 is cut.

The last sheet may consist, for instance, of the rest of the block 3 remaining in the tank 2 at the end of the cutting.

The opposite sidewalls 31 of the tank 2, arranged parallel to the rails 20, preferably extend away from each other in upward direction, thus forming an angle α, so as to facilitate the upward movements of the block 3. This angle α preferably has a value such that the walls 31 retain their guidance role during all the successive cuttings. The angle α which these walls 31 form varies, for instance, from 2° to 10° and preferably from 2° to 5°. The distance between the walls 31 and the material 3 has been exaggerated in FIG. 1 in order to make the showing clearer.

The advantages obtained by the apparatus 1 are as follows:

(a) It is possible to effect the cutting of the sheets from large blocks obtained by coagulation of the latex in tanks 2 which may be practically as large as desired. Thus, for instance, sheets can be cut from blocks of coagulum which are about 25 m long, 60 cm in width and 1 m in thickness, namely, a total weight of the blocks of about 15 tons, these blocks being obtained in tanks 2 which have practically the same dimensions as the blocks. In the event that the walls 31 of one of these tanks form an angle α other than zero with each other, the width of the tank is determined at the level of its half depth. By way of example, the known techniques for the direct obtaining of sheets by coagulation in tanks having aluminum partitions give quantities of coagulum of only about 600 to 900 kg. The present invention therefore makes it possible to simplify considerably the latex coagulation installation, since one thus uses a limited number of tanks which are free of complex partitions, which results, obviously, in substantially lower investments and operating expenses. The above figures concerning the carrying out of the invention are furthermore given merely by way of example and one can, in fact, contemplate tanks of a depth which is definitely greater than 1 m and of any length whatsoever, which may be far greater than 25 m. The width of the blocks may be any desired value, since it is limited only by the structure of the cutting and depressing means, which structure may vary as desired.

(b) The invention makes it possible to use latexes of different concentration without it being necessary to adjust this concentration, which further emphasizes the simplicity, flexibility and economy of the process. It is sufficient to adjust the thickness "e" in order, after drying, to obtain sheets of a desired thickness, this adjustment in thickness varying as a function of the concentration of the latex.

(c) The invention makes it possible to treat blocks having a small surface/volume ratio. The oxidation of the surface of the coagulum by the air is thus considerably limited. This advantage, in addition to the practical absence of crushing upon the cutting, leads to a rubber whose quality is both uniform and satisfactory.

(d) The invention makes it possible to vary easily the thickness "e" of the sheets 28 as desired, and to do so within very wide limits, the thickness "e" varying, for example, from 1 to 20 cm, and preferably from 2 to 5 cm, which values are in no way limitative.

Figure 4:
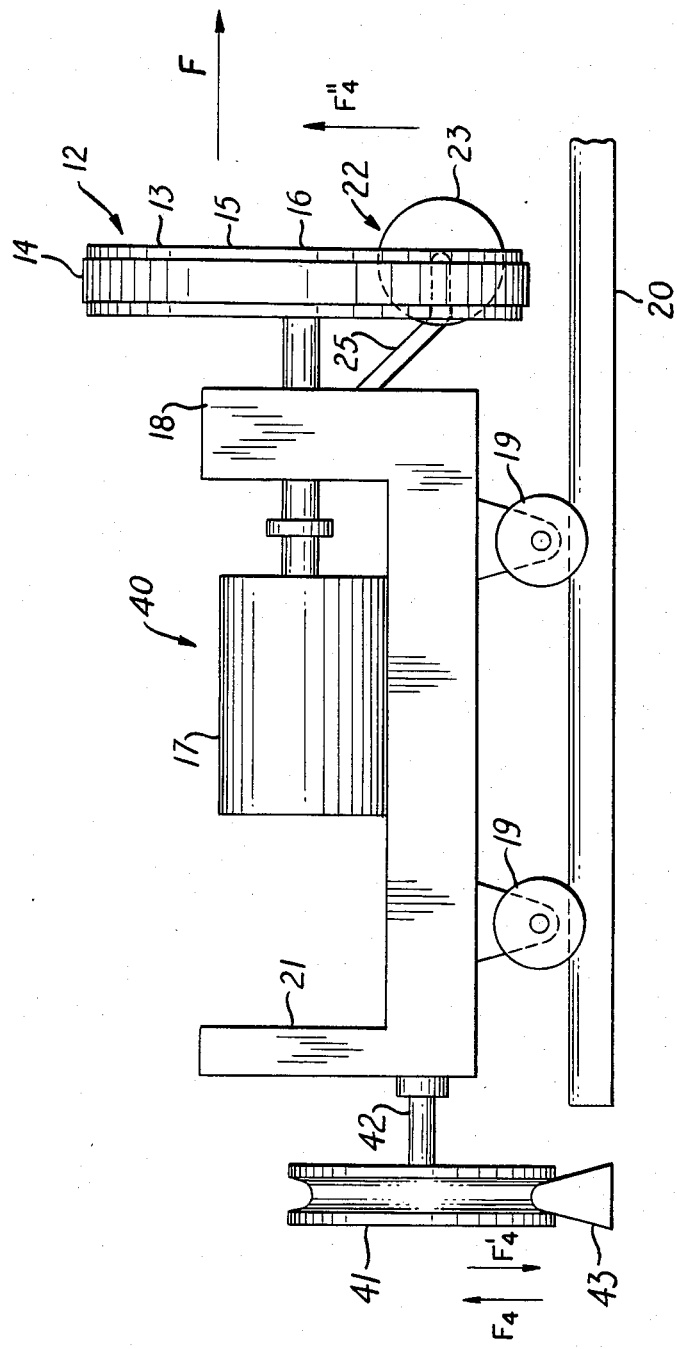
FIG. 4 shows, in side view, another apparatus in accordance with the invention.

FIG. 4 shows another apparatus 40 in accordance with the invention. This apparatus 40 comprises a wheel 41, mounted at the rear of the carriage 21, that is to say, at the end of the carriage opposite the pulleys 15, 16.

This wheel 41 is connected to the carriage 21 by means which make it possible to adjust the height of the wheel 41, these means being, for example, a vertically movable shaft 42. The vertical movements of the wheel 41 are indicated diagrammatically by the arrows $F_4$, $F'_4$.

The operation of the apparatus 40 is as follows. The carriage 21 being at one end of a tank 2, the wheel 41 is lowered so that it comes onto a rail 43 which is, for instance, perpendicular to the rails 20, the shaft 42 of the wheel 41 being then parallel to the rails 20. The end of the carriage 21 on which the pulleys 15, 16 are fastened is then raised until the wheels 19 leave the rails 20, this movement being indicated diagrammatically by the arrow $F''_4$. This lifting can be effected, for instance, manually or by mechanical means, not shown in the drawing, for instance a traveling crane. It is then easy to displace the carriage 21 by rotation of the wheel 41 on the rail 43 so as to place the carriage 21, for instance, above another tank 2, in order to effect a new cutting of sheets. The equipment for displacing the carriage 21 on the rail 43 has not been shown in the drawing for purposes of simplification, this equipment consisting, for instance, of a winch. Of course, the invention is not limited to the embodiments which have been described above.

What is claimed is:

1. A method for obtaining sheets from a flexible material, characterized by the following features:
    (a) the material is floated in a fluid so that a part of the material emerges above the fluid;
    (b) a depression is produced on a portion of the emerged part by the use of depressing means;
    (c) sheets are cut off from the depressed portion by the use of cutting means; and
    (d) the thickness of the sheets is adjusted by varying the difference in height between the level of the depressing means and the level of the cutting means in the depressed portion.

2. A method according to claim 1, characterized by the fact that the fluid is a liquid.

3. A method according to claim 1 or 2, characterized by the fact that the flexible material is a latex coagulum.

4. A method according to claim 3, characterized by the introduction into a tank of a latex which is caused to coagulate so as to obtain a block of latex coagulum, and by the introduction into the tank of a fluid in which the block is floated.

5. A method according to claim 4, characterized by the fact that the latex is a natural rubber latex.

6. An apparatus for obtaining sheets from a flexible material, characterized by the fact that it comprises:
    (a) means for floating the material in a fluid so that a part of the material emerges above the fluid;
    (b) depressing means for producing a depression on a portion of the emerged part;
    (c) cutting means for cutting off sheets from the depressed portion;
    (d) means for varying the difference in height between the level of the depressing means and the level of the cutting means in the depressed portion so as to adjust the thickness of the sheets.

7. An apparatus according to claim 6, characterized by the fact that the means for floating the material comprise a tank.

8. An apparatus according to claim 7, characterized by the fact that opposite sidewalls of the tank extend away from each other in upward direction forming an angle α.

9. An apparatus according to claim 8, characterized by the fact that the angle α formed by the sidewalls varies from 2° to 10°.

10. An apparatus according to claim 9, characterized by the fact that the angle α varies from 2° to 5°.

11. An apparatus according to claim 6, characterized by the fact that the cutting means comprise a bandsaw.

12. An apparatus according to claim 11, characterized by the fact that the bandsaw is toothless.

13. An apparatus according to claim 6, characterized by the fact that the depressing means comprise a roller capable of resting against a portion of the emerged part.

14. An apparatus according to claim 6, characterized by the fact that in the depressed portion the level of the depressing means is higher than the level of the cutting means.

15. An apparatus according to claim 13, characterized by the fact that the roller is cylindrical and by the fact that its lower generatrix is arranged practically above the cutting edge of the cutting means in the depressed portion.

16. An apparatus according to claim 6, characterized by the fact that it further comprises a carriage on which the depressing means and the cutting means are mounted, and means for displacing the carriage along the length of the material.

17. An apparatus according to claim 16, characterized by the fact that it further comprises means for displacing the carriage in a direction other than along the length of the material.

18. An apparatus according to claim 17, characterized by the fact that the means for displacing the carriage in a direction other than along the length of the material comprise a wheel connected to one end of the carriage and means for modifying the height of the wheel.

19. An apparatus according to claim 6, characterized by the fact that it further comprises means for varying the quantity and/or density of the fluid in which the material is floated.

20. An apparatus according to claim 6, characterized by the fact that the fluid is a liquid.

21. An apparatus according to claim 6, characterized by the fact that the flexible material is a latex coagulum.

22. An apparatus according to claim 21, characterized by the fact that the means for floating the material comprise a tank and by the fact that the apparatus further comprises means for introducing a latex into the tank and means for coagulating the latex so as to obtain a block of latex coagulum constituting the flexible material intended to be cut off into sheets.

23. An apparatus according to claim 22, characterized by the fact that the latex is a natural rubber latex.

* * * * *